(12) United States Patent
Hottinen (10) Patent No.: US 8,565,114 B2
(45) Date of Patent: Oct. 22, 2013

(54) COGNITIVE RADIO RESOURCE UTILIZATION

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 13/193,697

(22) Filed: Jul. 29, 2011

(65) Prior Publication Data

US 2013/0028346 A1   Jan. 31, 2013

(51) Int. Cl.
*H04W 24/02* (2009.01)
*H04W 28/26* (2009.01)
*H04B 15/00* (2006.01)

(52) U.S. Cl.
USPC ......... 370/252; 370/254; 370/329; 455/114.2

(58) Field of Classification Search
USPC ............... 370/252, 254, 328, 329; 455/114.2, 455/421, 450, 422.1
See application file for complete search history.

(56) References Cited

U.S. PATENT DOCUMENTS

| 8,000,294 B2* | 8/2011 | Uemura et al. ............... 370/329 |
| 8,364,080 B2* | 1/2013 | Desai et al. .................. 455/41.2 |
| 2002/0191633 A1* | 12/2002 | Ishikawa ....................... 370/442 |
| 2009/0046672 A1* | 2/2009 | Malladi et al. ................ 370/336 |
| 2009/0233646 A1* | 9/2009 | Cyzs et al. ................. 455/562.1 |
| 2011/0280226 A1* | 11/2011 | Lennvall et al. ............. 370/337 |

* cited by examiner

*Primary Examiner* — Ahmed Elallam
(74) *Attorney, Agent, or Firm* — Locke Lord LLP (57) ABSTRACT

The present document discloses a solution for utilizing guard time intervals of another wireless communication system. First, it is detected in a first wireless communication apparatus of a first wireless communication system a guard time interval following a transmission of a second wireless communication apparatus of a second wireless communication system. Thereafter, the first wireless communication apparatus is configured to schedule a transmission in the first wireless communication system to a transmission time interval starting on or after the beginning of the detected guard time interval and ending within the detected guard time interval of the second wireless communication system.

23 Claims, 3 Drawing Sheets

COGNITIVE RADIO RESOURCE UTILIZATION

FIELD

The invention relates to the field of radio communications and, particularly, to selecting transmission resources.

BACKGROUND

In many radio communication systems, guard time intervals are utilized to avoid interference. The guard time intervals may be used to avoid time domain inter-symbol interference caused by a non-ideal radio channel or inter-channel interference between consecutive transmissions. While, such guard time intervals reduce the interference, they represent time periods when a transmission medium is not in use to transfer payload data.

BRIEF DESCRIPTION

According to an aspect of the present invention, there is provided a method comprising: detecting, in a first wireless communication apparatus of a first wireless communication system, a guard time interval following a transmission of a second wireless communication apparatus of a second wireless communication system; and configuring the first wireless communication apparatus to schedule a transmission in the first wireless communication system to a transmission time interval starting on or after the beginning of the detected guard time interval and ending within the detected guard time interval of the second wireless communication system.

According to another aspect of the present invention, there is provided a method comprising acquiring a request message originating from a first wireless communication apparatus of a first wireless communication system in a second wireless communication apparatus of a second wireless communication system, the request message specifying a request to change a length of a guard time interval used in the second wireless communication system; processing the request by determining whether or not the requested change of the length of the guard time interval is currently possible in the second wireless communication system; and upon determining that the change of the length of the guard time interval is currently possible, causing at least one wireless communication apparatus of the second wireless communication system to change the length of the guard time interval, as specified in the request message.

According to another aspect of the present invention, there is provided an apparatus comprising: at least one processor; and at least one memory including a computer program code, wherein the at least one memory and the computer program code are configured, with the at least one processor, to cause the apparatus to: detect a guard time interval following a transmission of a second wireless communication apparatus of a second wireless communication system; and cause scheduling of a transmission in a first wireless communication system to a transmission time interval starting on or after a beginning of the detected guard time interval and ending within the detected guard time interval of the second wireless communication system.

According to another aspect of the present invention, there is provided an apparatus comprising: at least one processor; and at least one memory including a computer program code, wherein the at least one memory and the computer program code are configured, with the at least one processor, to cause the apparatus to: acquire a request message originating from a first wireless communication apparatus of a first wireless communication system, the request message specifying a request to change a length of a guard time interval used in a second wireless communication system; process the request by determining whether or not the requested change of the length of the guard time interval is currently possible in the second wireless communication system; and upon determining that the change of the length of the guard time interval is currently possible, cause at least one wireless communication apparatus of the second wireless communication system to change the length of the guard time interval, as specified in the request message.

According to another aspect of the present invention, there is provided an apparatus comprising means for detecting, in the first wireless communication apparatus of a first wireless communication system, a guard time interval following a transmission of a second wireless communication apparatus of a second wireless communication system; and means for configuring the first wireless communication apparatus to schedule a transmission in the first wireless communication system to a transmission time interval starting on or after the beginning of the detected guard time interval and ending within the detected guard time interval of the second wireless communication system.

According to yet another aspect of the present invention, there is provided a computer program product embodied on a non-transitory distribution medium readable by a computer and comprising program instructions which, when loaded into an apparatus, execute a computer process comprising: detecting, in a first wireless communication apparatus of a first wireless communication system, a guard time interval following a transmission of a second wireless communication apparatus of a second wireless communication system; and configuring the first wireless communication apparatus to schedule a transmission in the first wireless communication system to a transmission time interval starting on or after the beginning of the detected guard time interval and ending within the detected guard time interval of the second wireless communication system.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
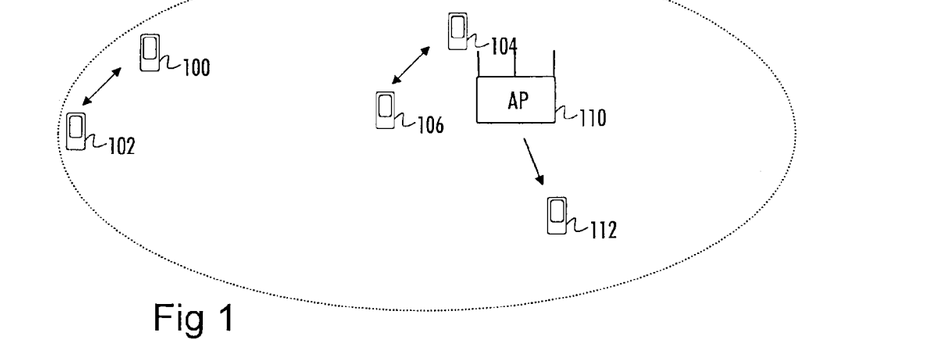
FIG. 1 illustrates a communication environment where two wireless communication systems operate in the same location.

FIG. 1 illustrates a communication scenario to which embodiments of the invention may be applied. Let us assume that two different wireless communication systems operate on overlapping frequency bands, and at least one of the systems applies cognitive radio communication procedures by selecting transmission parameters and resources such that interference between the systems is controlled and, effectively, negated. A first wireless communication system may be realized by a short range wireless communication system. Such a short range wireless communication system may be based on Bluetooth, IEEE 802.11, Zigbee, ultra-wideband (UWB), or some other short-range radio access technology. FIG. 1 illustrates two examples of the short range wireless communication system, wherein one short range wireless communication system comprises wireless communication apparatuses 100 and 102, and wherein the other short range wireless communication system comprises wireless communication apparatuses 104, 106. A second wireless communication system may be realized by a medium to long range wireless communication system, wherein the communication range is longer than the communication range of the first wireless communication system. The second wireless communication system comprises a central node 100, e.g. a base station, and at least one terminal device 112. The second wireless communication system may be a cellular mobile telecommunication system, a radio or television broadcast system, or another wireless communication system. Examples of the cellular mobile telecommunication system include Universal Mobile Telecommunication System and its Long-Term Evolution versions LTE and LTE-Advanced. Examples of the broadcast system include a Terrestrial Digital Video Broadcasting system (DVB-T) and DVB for handheld devices (DVB-h). In some embodiments, the second wireless communication system may, however, be a short range wireless communication system based on Ultra Wide Band (UWB) transmissions, for example.

Let us in the following description refer to the second wireless communication system as a primary system and to the first wireless communication system as a secondary system. This should be understood as a mere notation of the systems, and not limiting the role or priority of the systems.

With respect to the secondary communication system(s) in FIG. 1, wireless communication apparatuses 100, 102 communicate with each other at an edge of the coverage area of the primary system, while wireless communication apparatuses 104, 106 communicate with each other at centre of the coverage area of the primary system. As a consequence, the wireless communication apparatuses 104, 106 are close to the central node 100, while the wireless communication apparatuses 100, 102 have a greater distance to the central node 100.

The primary system may utilize in its transmissions a guard time interval in order to avoid interference induced to a communication signal in a radio channel. The guard time interval may be used to negate the effect of inter-symbol interference. The inter-symbol interference (ISI) is a form of distortion of the communication signal in which one symbol interferes with subsequent symbols. ISI is usually caused by multipath propagation or inherent non-linear frequency response of the radio channel causing successive symbols to "blur" together. This is an unwanted phenomenon as the previous symbols have similar effect as noise, thus making the communication less reliable. Providing a guard time interval between the symbols effectively negates the ISI, and no complex receiver architectures are needed to equalize the ISI. The guard time interval may be achieved by carrying out zero padding in which a zero signal is appended (zero-padded) to the communication signal. The zero padding period may be used as a prefix before the communication signal or as a postfix after the communication signal. In some embodiments, both prefix and postfix may be used. Examples of systems carrying out the zero padding are zero padding orthogonal frequency division multiplexing (ZP-OFDM) systems and the UWB. Another example of making the guard time interval is to use a cyclic prefix. Cyclic prefix is a prefix appended to the head of the communication signal, wherein the prefix is a repetition of a tail of the communication signal. The length of the cyclic prefix defines the length of the tail copied to the head of the communication signal. Cyclic prefix is used in many systems, e.g. the UMTS LTE, DVB-T, and other OFDM systems. Other guard time intervals are also used, e.g. time division multiple access systems utilize guard time intervals between time slots to avoid interference between the users allocated to consecutive time slots.

A problem with such guard time intervals is that they reduce spectral efficiency, because no useful transmission is carried out in the primary system during the guard time intervals. In some scenarios, the guard time interval may be oversized to ensure that the length of the guard time interval is longer than the length of an impulse response of the channel. Particularly, when wireless communication apparatuses 110, 112 are close to each other, the channel impulse response between them is very short and the guard time interval may be oversized with respect to the length of the channel impulse response. In a scenario where the apparatus 112 is at the edge of the communication range of the apparatus 110, the impulse response of the channel is typically higher but the length of the guard time interval may still be oversized. As a consequence, in both cases the oversizing of the length of the guard time interval causes spectral inefficiency.

Figure 2:
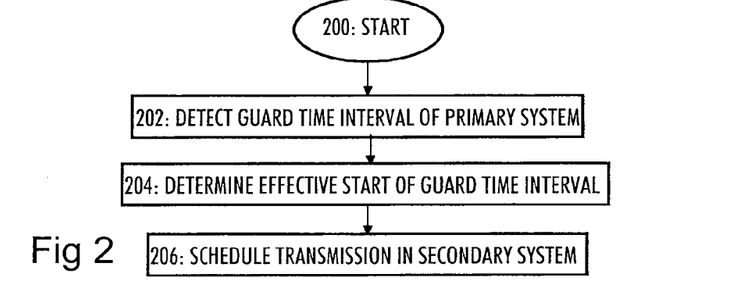
FIG. 2 illustrates a flow diagram of a process for utilizing guard time intervals for improving spectral efficiency according to an embodiment of the invention.

Let us now consider an embodiment of a method for utilizing the guard time intervals in the secondary system with reference to FIG. 2. The guard time interval may be considered to represent unused channels, channel resources, or time intervals that could be spatially reused by the secondary system. Referring to FIG. 2, the process starts in block 200. In block 202 a first wireless communication apparatus of the secondary system detects a guard time interval in a transmission of a second wireless communication apparatus of the primary system. Embodiments for detecting the guard time interval are discussed below. In an optionally executed block 204, the first wireless communication apparatus is configured to determine an effective guard time interval as observed in the first wireless communication apparatus. This may be carried out by determining a time interval when mutual interference between the primary system and the secondary system is on a sustainable level. This may be determined by estimating channel properties between the primary system and the secondary system. Block 204 may include determining a time instant when interference caused by the transmission of the second wireless communication apparatus is on a sustainable level in the first wireless communication apparatus. This may be determined by estimating a delay spread or an impulse response length of a radio channel between the first wireless communication apparatus and the second wireless communication apparatus, e.g. from a pilot signal transmitted by the second wireless communication apparatus. This may set a beginning of the effective guard time interval. Alternatively or additionally, block 204 may include determining a time instant when interference caused by the secondary system transmission is no longer on a sustainable level towards the primary system, e.g. a time instant when the secondary system transmission overlaps a subsequent transmission time interval of the primary system. This may also be determined by estimating the delay spread or the impulse response length of the radio channel between the first wireless communication apparatus and the second wireless communication apparatus. As a consequence, block 204 may be used to determine a sub-interval within the detected guard time interval to which the secondary system transmission may be scheduled. At least part of the guard time interval may be excluded from the scheduling so as to avoid the interference. The whole guard time interval may be excluded from scheduling in some cases where, for example, the duration of the effective guard time interval is detected to be too short. In block 206, the first wireless communication apparatus is configured to schedule a transmission in the secondary system to a transmission time interval starting on or after the determined effective beginning of the guard time interval and ending within the detected guard time interval of the primary system. In some embodiments plurality of said guard time intervals may be detected, and the scheduling may span over a plurality of guard time intervals, as discussed below.

In the above-described embodiment, the guard time intervals of the primary system are used in the secondary system and, therefore, overall spectral efficiency is improved. A receiver of the primary system discards any signal received during the guard time interval, so the transmission of the secondary system during the guard time interval does not cause interference in the receiver. An assumption is that the wireless communication systems use otherwise the same resources, e.g. the frequency band and the secondary system is within the communication range of the primary system. The wireless communication devices of the primary system may or may not be within the communication range of the secondary system.

Block 204 may be carried out by determining an interference level caused by the primary system transmission towards the secondary system, e.g. towards the apparatus carrying out block 204. This interference level may be compared with a threshold level representing the sustainable level. When the interference level drops below the threshold level, the effective guard time interval begins. In another embodiment, block 204 is carried out by applying a fixed guard period to the beginning of the detected guard time interval and assuming that the interference is on the sustainable level after the guard period has expired from the detected beginning of the guard time interval. Thus the effective beginning of the guard time interval is delayed from the detected beginning of the guard time interval by the duration of the fixed guard period. The duration of the fixed guard period may be a static or a semi-static parameter, and it may be updated as a result of estimating the radio channel between the primary system transmitter and the apparatus carrying out block 204.

Figure 3:
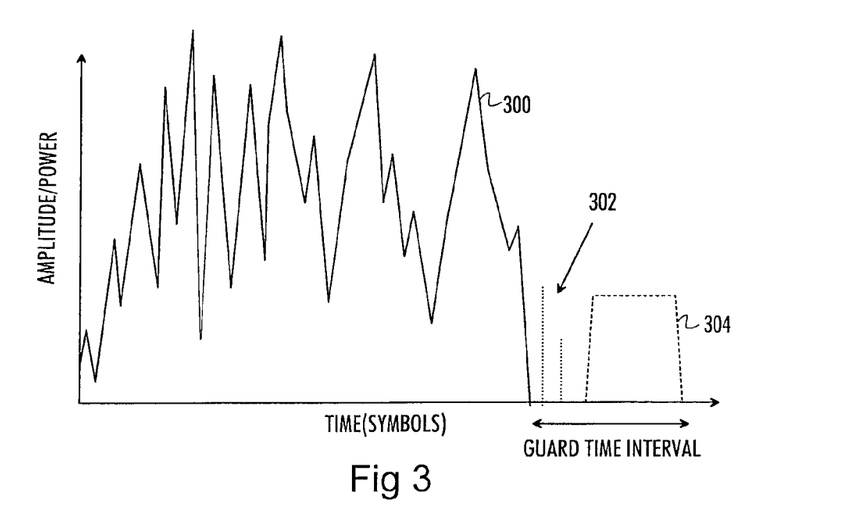
FIG. 3 illustrates an example of a graph comprising a transmission signal and a guard time interval during embodiments of the invention may be utilized.

FIG. 3 illustrates a graph showing a signal 300 transmitted by the second wireless communication apparatus and the guard time interval when there is no transmission in the primary system. The guard time interval is free transmission time for the secondary system and, therefore, a transmission may be scheduled in the secondary system. A signal transmitted in the secondary system is denoted by 304. As the vacant time interval caused by the guard time interval is utilized by the transmission of the signal 304, the spectral efficiency is improved.

Because of multipath propagation of signal 300 in the radio channel, signal components may be present after the signal 300. These multipath components are denoted by dotted vertical lines 302 in FIG. 3. These multipath components 302 are the reason why the primary system employs the guard time interval. The multipath components 302 may also cause interference to the secondary system. Therefore, a wireless communication apparatus of the secondary system may be configured to detect a substantially interference-free time interval within the guard time interval, wherein the multipath components are no longer present and, thus, the transmission of the signal 304 may be scheduled without any interference suffered from the multipath components 302. Similarly, the apparatus of the secondary system may estimate the duration of the multipath components of the secondary system, e.g. and impulse response length of the radio channel in the secondary system, and cease transmission before the end of the guard time interval so that interference caused by the delayed multipath components of the secondary system transmission towards a subsequent transmission in the primary system is minimized. If the channel is flat, the delay spread or impulse response length is negligible, and the effective beginning of the guard time interval may equal the actual beginning of the guard time interval. However, when the channel is not flat and induces multipath propagation, the effective beginning of the guard time interval may be later than the actual beginning of the guard time interval.

The actual duration of the guard time interval of the primary system that is usable by the secondary system may be called residual guard time interval. The residual guard time interval may be defined by the real duration of the guard time interval minus the time needed for detecting the guard time interval in the secondary system minus the portion of the guard time interval not used because of interference avoidance. In general, the residual guard time interval may be defined as the duration of the guard time interval that is used by the secondary system to access the radio channel.

Figure 4:
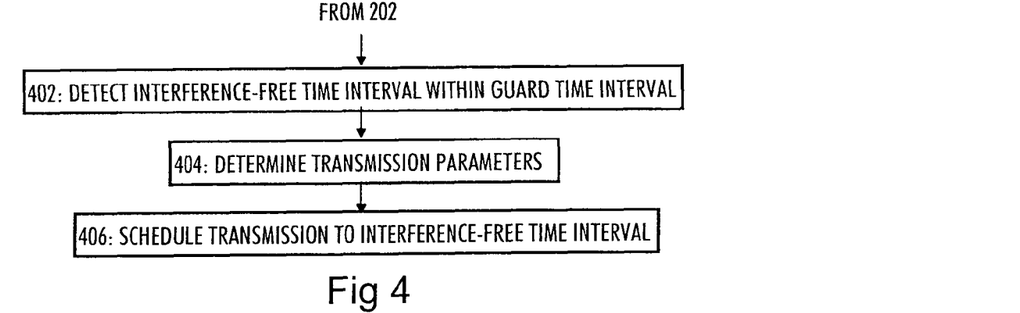
FIG. 4 illustrates another embodiment for utilizing guard time intervals for improving spectral efficiency according to an embodiment of the invention.

Referring to FIG. 4, let us consider an embodiment for utilizing the guard time interval of the primary system. The flow diagram of FIG. 4 may be seen as an embodiment of block 204 of FIG. 2. As a consequence, the process of FIG. 4 may be carried out in a wireless communication apparatus of the secondary system. In block 402, the interference-free time interval comprised within the guard time interval of the primary system is detected. There are several embodiments for estimating the interference-free time interval. According to an embodiment, a wireless communication apparatus of the secondary system first determines the guard time interval from system parameters of the primary system, for example. The guard time interval may be predetermined and stored in the wireless communication apparatus. The wireless communication apparatus may be configured to communicate with the primary system so as to acquire the length of the guard time interval. The wireless communication apparatus may also comprise a receiver of the primary system so as to acquire synchronization with the primary system so as to determine the time instance of the guard time interval. The receiver may also be configured to determine channel properties of the primary system in the location of the wireless communication apparatus. The channel properties may be derived by estimating the length of an impulse response of the channel between a primary system transmitter and the wireless communication apparatus. The length of the impulse response may be derived according to state-of-the art techniques. Alternatively, a delay spread or any other channel property indicating the time duration in which signal components of the primary system still arrive at the wireless communication apparatus during the guard time interval. This time duration may then be discarded from the beginning of the guard time interval, thus acquiring the interference-free time interval. According to another embodiment, the wireless communication apparatus may simply monitor the periodicity of the interference-free time intervals, e.g. intervals in which it does not detect any signal from the primary system. Statistically, the interference-free time intervals are periodic and, upon detection of a determined number of periodic interference-free time intervals, the wireless communication apparatus may schedule a secondary system transmission to an estimated next periodic interference-free time interval which may be extrapolated from the monitored periodic interference-free time intervals. In yet another embodiment, the wireless communication apparatus may employ carrier sense multiple access (CSMA) principles in detecting the guard time interval of the primary system. The wireless communication apparatus may be configured to monitor for the interference-free time interval and, upon detecting that the channel has been free for a determined duration, the wireless communication apparatus may schedule the secondary system transmission. The determined time duration employed for determining the presence of the interference-free time interval may be very short with respect to the length of the guard time interval of the primary system, e.g. at least a decade shorter than the guard time interval.

The determining of the interference-free time interval may be carried out by using multiple symbols received from the primary system. With respect to the transmission by the secondary system, the secondary system may carry out the transmission during the interference-free time intervals by using an arbitrary coding and modulation schemes. The secondary system may also employ time-hopping where a scheduled transmission of the secondary system spans over multiple guard time intervals of the primary system.

The closer the secondary system is to the transmitter of the primary system, the longer is the interference-free time interval within the guard-time interval. This comes from the fact that the signal 300 transmitted by the primary system transmitter typically propagates through relatively direct paths to the wireless communication apparatus of the secondary system. The further the secondary system is from the primary system transmitter, the longer is the channel impulse response (and the delay spread) and, thus, the shorter is the interference-free time interval. Referring to FIG. 1 apparatuses 104, 106 closer to the central node 110 typically observe longer available transmission time intervals for mutual communication than apparatuses 100, 102 located at an edge of the coverage area of the central node.

In block 404, transmission parameters for use in the transmission during the interference-free time interval are determined. The transmission parameters may be selected cognitively by considering the interference towards other systems, e.g. the primary system. As a consequence, at least one of transmission power and the duration of the transmission may be selected appropriately. The duration may be selected such that the scheduled transmission timing ends before the end of the guard time interval so as to prevent overlapping transmissions with the primary system. As such, any transmission by the secondary system reaching a receiver of the primary system does not interfere with the receiver, if the receiver discards any signal received during the guard time interval. In some embodiments, a guard interval may be provided between the end of the scheduled transmission and the end of the guard time interval so as to prevent interference caused by multipath propagation towards the primary system. The length of the guard interval and the transmission power may be determined jointly such that the length of the guard interval is proportional to the transmission power. The transmission power may be determined on the basis of the channel state between a transmitter and a receiver of the secondary system, required data rate, etc. A maximum transmission power may also be instructed by the primary system. The transmission parameters may also include a modulation and coding scheme which may be derived according to the required data rate. The relation between the required data rate and the modulation and coding scheme may be roughly derived from a following relation: total bit rate=bandwidth*length of the interference-free time interval*bit rate of the modulation and coding scheme. Note that block 404 may be carried out before block 402.

Then, the transmission is scheduled to the interference-free time interval in block 406 with the transmission parameters determined in block 404. There are several embodiments as how the scheduling is carried out. For example, one of the apparatuses of the secondary system may be a master device that schedules the transmissions in the secondary system. The master device may send scheduling messages to the slave devices, wherein the master device specifies which one of the slave devices is scheduled to transmit, and the master device may also determine and indicate the transmission parameters in the control message. In other embodiments, the scheduling is carried out through channel contention in which the apparatuses compete for the access the transmission medium, and an apparatus winning the channel contention gains the access to carry out the transmission. The channel contention may also be used to avoid interference towards any other user of the same frequency band. In such cases, the apparatus may indicate at least some of the transmission parameters in a header of a transmitted data packet. The actual radio access in the secondary system should be understood as not limiting the present invention. In yet other embodiments, a plurality of secondary system apparatuses detect the guard time interval jointly and negotiate about the channel access during the detected guard time interval by exchanging appropriate control plane signalling messages.

Figure 5:
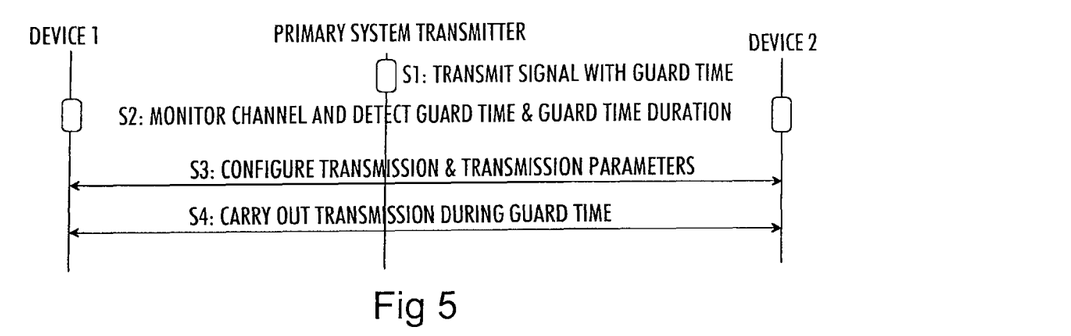
FIG. 5 illustrates a signalling diagram of related to utilizing guard time intervals for improving spectral efficiency according to an embodiment of the invention.

FIG. 5 illustrates an embodiment of the channel utilization during the guard time interval in a system level. Device 1 and Device 2 in FIG. 5 refer to devices of the secondary system, e.g. apparatuses 100, 102 or apparatuses 104, 106. In S1, the primary system transmitter transmits a signal, and a guard time interval follows the transmission of the signal. In S2, the at least one of the devices 1, 2 monitor the radio channel and detect the guard time interval and determine its duration. The guard time interval and determine its duration may be determined from system parameters, or it may be determined by sensing the radio channel. S2 may precede S1. In S3, the device 1 determines transmission parameters for the secondary system transmission and schedules the transmission to the guard time interval. The scheduling may be carried out by transmitting a scheduling message to the other device 2, or the scheduling may be carried out by transmitting directly a data packet during the guard time interval. As mentioned above, the devices 1, 2 may both carry out a channel contention procedure to gain the access to transmit during the guard time interval. In S4, the transmission is then carried out during the guard time interval. The guard time interval may be utilized for unidirectional transmission or for bidirectional transmission, e.g. transmission of a data packet to one direction and transmission of a reception acknowledgment of the data packet to the other direction.

Above, the guard time interval has been described in the context where the primary system does not transmit any signal, or transmits a zero-padded signal, during the guard time interval. Thus, the interference-free time interval may be determined and it may be used in the secondary system transmission. The present invention is, however, applicable to other guard time intervals as well. An embodiment of the invention configures a wireless communication apparatus of the secondary system to monitor for the cyclic prefix period of the primary system. The estimation of the length of the channel impulse response or the delay spread of the radio channel may be used in this case as well in order to determine when the cyclic prefix interval effectively starts from the point of view of the secondary system. As a consequence, the payload signal of the primary system does not interfere with the secondary system transmission.

Figure 6:
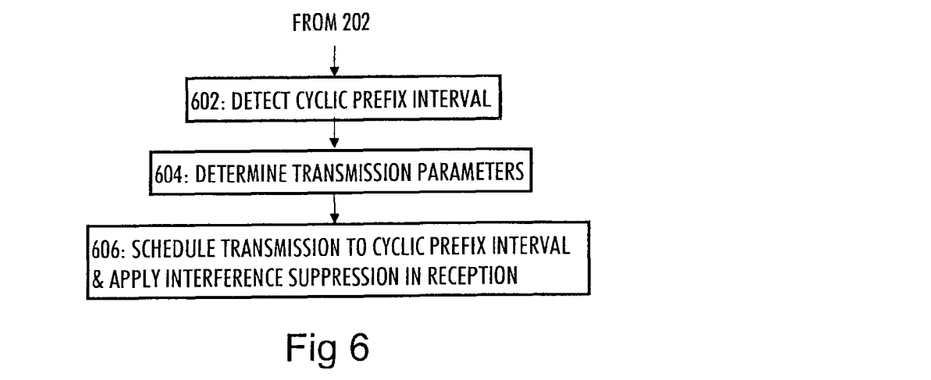
FIG. 6 illustrates an embodiment with interference suppression feature for use in the reception during the guard time interval.

As the cyclic prefix is a signal actively transmitted by the primary system, a receiver of the secondary system experiences the cyclic prefix as interference which interferes with the secondary system transmission during the guard time interval. As a consequence, measures may be taken to suppress the interference. FIG. 6 illustrates a flow diagram of an embodiment for utilizing the guard time intervals when the primary system utilizes a time interval of the cyclic prefix as the guard time interval. The process of FIG. 6 may be carried out in a wireless communication apparatus of the secondary system. Referring to FIG. 6, a cyclic prefix interval of the primary system transmitter is detected in the wireless communication apparatus in block 602. The cyclic prefix may be detected from the system parameters of the primary system, or the wireless communication apparatus may apply channel sensing to detect the cyclic prefix. As the cyclic prefix is a repetition of a part of the transmitted signal, the cyclic prefix may be detected by autocorrelating the signal received from the primary system transmitter. By observing several cyclic prefixes, a periodicity of the cyclic prefix or a time pattern of the cyclic prefix may be obtained. By extrapolating this pattern into the future, upcoming cyclic prefix intervals may be determined.

In block 604, the transmission parameters are determined for the next transmission in the secondary system during a next cyclic prefix interval. The transmission parameters may be determined as in block 404. In block 606, the transmission is configured to occur in the secondary system during the next cyclic prefix interval. As the cyclic prefix causes interference to the secondary system transmission, a secondary receiver may be configured to apply an interference suppression process to the signal received from a secondary system transmitter in connection with the configured secondary system transmission during the cyclic prefix interval. The interference suppression process may utilize a primary system receiver comprised in the same apparatus as the secondary system receiver, when determining the parameters of the cyclic prefix. For example, the primary system receiver may be configured to receive the primary system transmission comprising the cyclic prefix at the same time as the secondary system receiver receives the secondary system transmission during the cyclic prefix interval. The primary system receiver may process the received primary system transmission by decoding it and determining the parameters of the cyclic prefix. The determined parameters of the cyclic prefix may enable the reconstruction of the cyclic prefix in the primary system receiver. The parameters of the cyclic prefix are then applied to an interference suppression unit comprised in the secondary system receiver. With the knowledge of the parameters of the cyclic prefix, the interference suppression unit of the secondary system receiver is able to reduce the contents of the cyclic prefix from the signal received by the secondary system receiver.

With respect to FIG. 6 and the operation of the secondary system receiver, block 604 may be carried out in connection with block 606 when the transmission parameters of the secondary system transmission are indicated, for example, in a header of the secondary system transmission.

Figure 7:
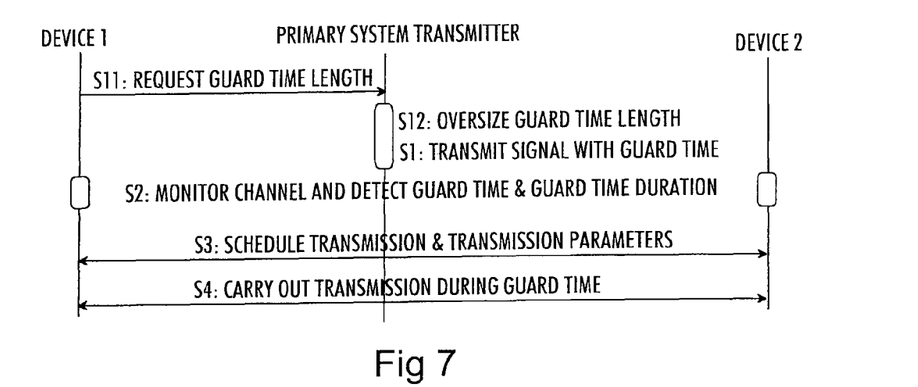
FIG. 7 illustrates an embodiment where the two systems communicate with each other so as to negotiate transmission parameters according to an embodiment of the invention.

According to an embodiment an apparatus of the primary system may be configured to adjust the length of its guard time interval upon reception of such a request from an apparatus of the secondary system. In particular, the apparatus of the primary system may be configured to oversize the length of its guard time interval so as to provide the secondary system with more transmission resources. Similarly, the apparatus of the secondary system may be configured to request the primary system to provide a guard time interval of determined length. The apparatus of the secondary system may determine the request length according to the current demand for transmission resources, e.g. on the basis of a quality-of-service (QoS) classification of a current secondary system connection. A longer guard time interval may be requested for higher QoS classes. FIG. 7 illustrates a signalling diagram of such a procedure. Again, devices 1, 2 are wireless communication apparatuses of the secondary system. At least one of the devices 1, 2 is provided with a bidirectional control plane connection with the primary system. The bidirectional control plane connection may be used to transfer system parameters, e.g. the length of the guard time interval, to the secondary system. Referring to FIG. 7, device 1 determines in S11 that additional resources are needed and, as a consequence, it determines the time resources needed to comply with the resource demand. The time resources may map directly to the needed guard time interval of the primary system. Then, the device 1 creates a request message comprising an information element specifying the requested length of the guard time interval. The device 1 then transmits the request message to a primary system transmitter in S11. In S12, upon reception of the request the primary system transmitter, or an apparatus in the primary system transmitter, processes the request and determines whether or not the secondary system may be provided with the extra resources. The primary system transmitter may determine its current data transfer capacity with respect to the currently needed data transfer capacity. If the primary system is not fully utilizing its maximum capacity, the primary system transmitter may oversize the length of the guard time interval so as to provide additional time resources. On the other hand, if the oversizing is not possible because of high traffic in the primary system, the primary system transmitter may reject the request. In S12, the primary system transmitter oversizes the length of the guard time interval to comply with the requested length. The primary system transmitter may also transmit a confirmation message to the device 1 so as to confirm approval of the request. Thereafter, steps S1 to S4 may be carried out as described above. An advantage of this embodiment is flexible cooperation between the primary system and the secondary system which enables improvement of total spectral efficiency.

Figure 8:
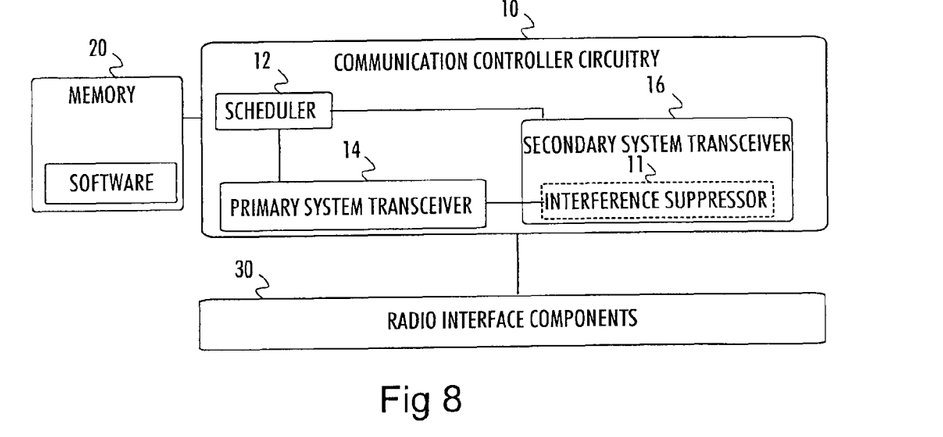
FIG. 8 illustrates a block diagram of an apparatus according to an embodiment of the invention.

FIG. 8 illustrates an embodiment of an apparatus comprising means for carrying out the above-mentioned functionalities of the apparatus of the secondary system. As mentioned above, the apparatus may be a wireless communication apparatus of any wireless network equipped with cognitive radio utilization capabilities. Examples of such networks are an IEEE 802.11 network, or any other wireless mesh or ad hoc network. The apparatus may be a computer (PC), a laptop, a tabloid computer, a cellular phone, a palm computer, a fixed base station operating as an access point, or any other apparatus provided with radio communication capability. In another embodiment, the apparatus is comprised in such a wireless communication apparatus, e.g. the apparatus may comprise a circuitry, e.g. a chip, a processor, a micro controller, or a combination of such circuitries in the wireless communication apparatus.

Referring to FIG. 8, the apparatus may comprise a communication controller circuitry 10 configured to control the communications in the wireless communication apparatus. The communication controller circuitry 10 may comprise a primary system transceiver circuitry 14 comprising at least capability of operating as a receiver of the above-mentioned primary system. The primary system transceiver circuitry 14 may be configured to process a signal received from the primary system transmitter and to determine the guard time interval. The primary system transceiver circuitry 14 may also be configured to receive control information from the primary system, e.g. system parameters enabling the determination of the guard time interval. The primary system may broadcast the system information in which case, the primary system transceiver circuitry 14 may be configured to operate as a broadcast receiver. In some embodiments, the primary system transceiver circuitry 14 also comprises control logic for communication with the primary system bidirectionally. Then, the primary system transceiver circuitry 14 may be configured to communicate with the primary system so as to negotiate about the length of the guard time interval, as described above.

The communication controller circuitry 10 may further comprise a secondary system transceiver circuitry 16 comprising capability of operating as a transceiver in the above-mentioned secondary system. As a consequence, the secondary system transceiver circuitry 16 may be configured to establish, maintain, and terminate connections in the secondary system. The secondary system transceiver circuitry 16 may be configured to apply different radio access scheme and operational parameters than the primary system and the primary system transceiver circuitry 14. The secondary system transceiver circuitry 16 may be configured to carry out communication (transmission and/or reception) during the guard time intervals of the primary system. In order to control the operation of the secondary system transceiver circuitry 16, the communication controller circuitry 10 may comprise a scheduler circuitry 12 configured to acquire the time instants of the guard time intervals, as determined by the primary system transceiver circuitry 14 and to control the secondary system transceiver circuitry 16 to carry out communications during the guard time intervals.

In the embodiments where the apparatus supports the operation during cyclic prefix intervals or in other guard time intervals where the primary system transmits an interfering signal, the primary system transceiver circuitry 14 may be configured to determine the parameters of the interfering primary system cyclic prefix (or the other interfering signal) and to apply the determined parameters to an interference suppressor circuitry 11 comprised in the secondary system transceiver circuitry 16. As a consequence, the interference suppressor circuitry 11 is able to utilize the received parameters and use them in connection with reception of a secondary system transmission, e.g. a frame. As a consequence, the interfering signal may be suppressed and communication reliability may be improved.

The circuitries 11 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 11 to 16 or all of them. It should be noted that the circuitries may be configured to carry digital domain procedures related to the communication in the primary system and the secondary system. For example, the circuitries may carry out at least medium access control (MAC) and higher layer procedures. In some embodiments, the circuitries may also carry out physical layer digital procedures, e.g. the interference suppression of the received signal. The apparatus may further comprise radio interface components 30 providing the apparatus with radio communication capabilities within the primary system and the secondary system. The radio interface components 30 may comprise standard well-known components such as amplifier, filter, frequency-converter, (de)modulator, and encoder/decoder circuitries, analog-to-digital (A/D) and digital-to-analog (D/A) converters, and one or more antennas.

The apparatus may further comprise a memory 20 that stores computer programs (software) configuring the apparatus to perform the above-described functionalities of the wireless communication apparatus. The memory 20 may also store communication parameters and other information needed for the wireless communications, e.g. information on the guard time intervals of the primary system. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless communication apparatus comprises at least one processor and at least one memory including a computer program code, wherein the at least one memory and the computer program code are configured, with the at least one processor, to cause the apparatus to carry out the steps of any one of the processes of FIG. 2. In further embodiments, the at least one memory and the computer program code are configured, with the at least one processor, to cause the apparatus to carry out any one of the embodiments related to utilizing the guard time intervals of the primary system, as described above in connection with FIGS. 2 to 7. Accordingly, the at least one processor, the memory, and the computer program code form processing means for carrying out embodiments of the present invention in the wireless communication apparatus.

With respect to the embodiment where the primary system transmitter and the secondary system device negotiate about the length of the guard time interval, there is provided an apparatus carrying out the functions of the primary system transmitter. The apparatus comprises at least one processor and at least one memory including a computer program code, wherein the at least one memory and the computer program code are configured, with the at least one processor, to cause the apparatus to carry out the steps of FIG. 7 that are carried out by the primary system transmitter. With reference to FIG.

Figure 9:
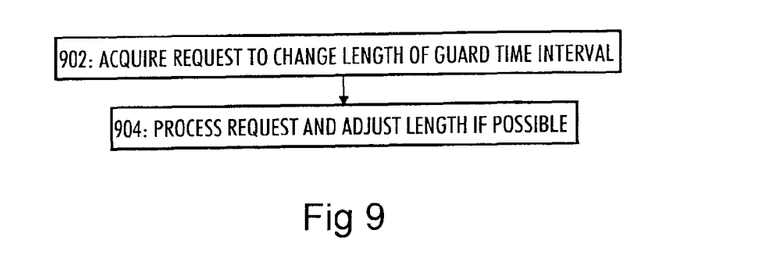
FIG. 9 illustrates a flow diagram of a process for changing the length of the guard time interval according to an embodiment of the invention.

9, the at least one memory and the computer program code are configured, with the at least one processor, to cause the apparatus to carry out a method for adjusting the length of the guard time interval in the primary system. Referring to FIG. 9, a request message originating from the secondary system is acquired in block 902. The request message specifies a request to change the length of the guard time interval used in the primary system. The request may also specify the requested length of the guard time interval, or it may request generally that the length of the guard time interval should be increased.

In block 904, the apparatus processes the request by determining whether or not the requested change of the length of the guard time interval is currently possible in the primary system. This may comprise checking the current traffic load in the primary system, as described above. Upon determining that the change of the length of the guard time interval is currently possible, at least one wireless communication apparatus of the primary system is caused to change the length of the guard time interval, as specified in the request message. The apparatus may configure its own radio transmitter circuitry to change the length of the guard time interval, or the apparatus may create a control message configuring another primary system transmitter apparatus to change the length of the guard time interval, or both.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless communication systems defined above but also to other suitable wireless communication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   detecting, in a first wireless communication apparatus of a first wireless communication system, a guard time interval following a transmission of a second wireless communication apparatus of a second wireless communication system; and
   configuring the first wireless communication apparatus to schedule a transmission in the first wireless communication system to a transmission time interval starting on or after the beginning of the detected guard time interval and ending within the detected guard time interval of the second wireless communication system.

2. The method of claim 1, further comprising detecting, as the guard time interval, an interval used by the second wireless communication apparatus to negate time-domain inter-block interference.

3. The method of claim 2, further comprising detecting, as the guard time interval, a zero-padding interval in a signal transmitted by the second wireless communication apparatus.

4. The method of claim 1, further comprising detecting, as the guard time interval, an interval when no signal of the second wireless communication system is received in the first wireless communication apparatus.

5. The method of claim 1, further comprising:
   determining an effective guard time interval as observed in the first wireless communication apparatus by determining a time interval when interference between the first wireless communication system and the second wireless communication system is on a sustainable level, wherein the effective guard time interval is a sub-interval of the detected guard time interval; and
   configuring the first wireless communication apparatus to schedule the transmission in the first wireless communication system to the effective guard time interval.

6. The method of claim 5, further comprising:
   determining an interference-free time interval, within the guard time interval, during which interference-free time interval no signal components of the transmission of the second wireless communication apparatus are received in the first wireless communication apparatus; and
   configuring the first wireless communication apparatus to schedule the transmission in the first wireless communication system to the interference-free time interval.

7. The method of claim 1, further comprising detecting the guard time interval through channel measurements.

8. The method of claim 1, further comprising detecting the guard time interval through knowledge of system parameters of the second wireless communication system.

9. The method of claim 1, further comprising causing the first wireless communication apparatus to request the second wireless communication system to apply a guard time interval of determined length.

10. The method of claim 1, further comprising causing the first wireless communication apparatus to apply different radio access parameters than the radio access parameters of the second wireless communication system.

11. The method of claim 1, wherein a communication range of the first wireless communication apparatus is shorter than the communication range of the second wireless communication apparatus.

12. An apparatus comprising:
at least one processor; and
at least one memory including a computer program code, wherein the at least one memory and the computer program code are configured, with the at least one processor, to cause the apparatus to:
detect a guard time interval following a transmission of a second wireless communication apparatus of a second wireless communication system; and
cause scheduling of a transmission in a first wireless communication system to a transmission time interval starting on or after a beginning of the detected guard time interval and ending within the detected guard time interval of the second wireless communication system.

13. The apparatus of claim 12, wherein the at least one memory and the computer program code are configured, with the at least one processor, to cause the apparatus to detect, as the guard time interval, an interval used by the second wireless communication apparatus to negate time-domain inter-block interference.

14. The apparatus of claim 13, wherein the at least one memory and the computer program code are configured, with the at least one processor, to cause the apparatus to detect, as the guard time interval, a zero-padding interval in a signal transmitted by the second wireless communication apparatus.

15. The apparatus of claim 12, wherein the at least one memory and the computer program code are configured, with the at least one processor, to cause the apparatus to detect, as the guard time interval, an interval when no signal of the second wireless communication system is received in the first wireless communication apparatus.

16. The apparatus of claims 12, wherein the at least one memory and the computer program code are configured, with the at least one processor, to cause the apparatus to:
determine an effective guard time interval as observed in the first wireless communication apparatus by determining a time interval when interference between the first wireless communication system and the second wireless communication system is on a sustainable level, wherein the effective guard time interval is a sub-interval of the detected guard time interval; and
cause said scheduling of the transmission in the first wireless communication system to the effective guard time interval.

17. The apparatus of claim 16, wherein the at least one memory and the computer program code are configured, with the at least one processor, to cause the apparatus to:
determine an interference-free time interval, within the guard time interval, during which interference-free time interval no signal components of the transmission of the second wireless communication apparatus are received in the first wireless communication apparatus; and
cause said scheduling of the transmission in the first wireless communication system to the interference-free time interval.

18. The apparatus of claims 12, wherein the at least one memory and the computer program code are configured, with the at least one processor, to cause the apparatus to detect the guard time interval through channel measurements.

19. The apparatus of claims 12, wherein the at least one memory and the computer program code are configured, with the at least one processor, to cause the apparatus to detect the guard time interval through knowledge of system parameters of the second wireless communication system.

20. The apparatus of claim 12, wherein the at least one memory and the computer program code are configured, with the at least one processor, to cause the apparatus to request the second wireless communication system to apply a guard time interval of determined length.

21. The apparatus of claims 12, wherein the at least one memory and the computer program code are configured, with the at least one processor, to cause the apparatus to configure different radio access parameters than the radio access parameters of the second wireless communication system.

22. The apparatus of claims 12, wherein a communication range in the first wireless communication system is shorter than the communication range of the second wireless communication apparatus.

23. A computer program product embodied on a non-transitory distribution medium readable by a computer and comprising program instructions which, when loaded into an apparatus, execute a computer process comprising:
detecting, in a first wireless communication apparatus of a first wireless communication system, a guard time interval following a transmission of a second wireless communication apparatus of a second wireless communication system; and
configuring the first wireless communication apparatus to schedule a transmission in the first wireless communication system to a transmission time interval starting on or after the beginning of the detected guard time interval and ending within the detected guard time interval of the second wireless communication system.

\* \* \* \* \*